United States Patent Office

FRANCOIS LOUIS ROUX, OF TOULON, FRANCE.

Letters Patent No. 63,654, dated April 9, 1867.

---

IMPROVED PLASTIC COMPOUND FOR PROTECTING METALLIC AND NON-METALLIC SURFACES FROM THE EFFECTS OF AIR AND WATER.

---

The Schedule referred to in these Letters Patent and making part of the same.

---

TO ALL WHOM IT MAY CONCERN:

Be it known that I, FRANCOIS LOUIS ROUX, of Toulon, in the Empire of France, Captain in the Imperial Navy, and Officer of the Legion of Honor, have invented "An Improved Plastic Compound for the Protection of Metallic and Non-Metallic Surfaces from the Action of Water, Air, and other Causes of Deterioration;" and I do hereby declare that the following is a full, clear, and exact description thereof.

My invention relates to an improved plastic compound intended to protect metallic and non-metallic surfaces from the action of water, air, and other causes of deterioration to which they may be exposed.

This compound is prepared as follows: To a solution of ten parts of caoutchouc in forty-five parts of essence of turpentine I add, by small portions at a time, an impalpable powder composed of sulphate of barytes sixty parts, sublimed sulphur twenty-three parts, white lead (céruse) twelve parts. These ingredients being thoroughly incorporated with the caoutchouc solution, the product is preserved for use in well-closed jars or other capacities. It does not become completely homogeneous till from three to four days after its preparation. The plastic compound thus formed may, in some cases, be applied directly to the surfaces which it is intended to protect, but, as a general rule, the latter should be previously covered with a ground coating of minium paint or coal tar, or again with metallic zinc deposited by one of the known processes. Over this ground I apply a light coating of mordant composed of coal tar, ninety parts, resin, pulverized, seven parts, litharge, three parts; or again, of coal tar, ninety parts, and essence of turpentine, ten parts, and when dry I apply, by means of a flexible spatula, the coatings of plastic compound first above described. A single coating of this compound is generally sufficient for the preservation of surfaces which are not exposed to the action of sea water, but for the hulls and armor-plates of ships a second layer is always required. To prevent the adherence of marine plants, shells, and other organic incrustations, the outer coating may be sprinkled over with copper filings, either alone or combined with powdered antimony or other metals or alloys capable of resisting, to a certain extent, the action of the sea water. The adhesion of these metallic filings to the plastic coating is obtained by simply passing the hand over the latter within an hour after its application, and, if need be, beating it slightly with a mallet when thoroughly dried. In certain cases it may be found advantageous to incorporate the metallic filings with the plastic matter before its application to the surfaces to be protected. Or again, in the preparation of this matter, the proportions of barytes, sulphur, and white lead, above laid down, may be lessened, and the difference be made up by equivalents of other substances capable of preventing the incrustation of the submerged surfaces.

The hulls of wooden ships are effectually preserved from vegetations, insects, &c., &c., by one or two layers of the plastic matter combined as above with metallic or other poisonous ingredients. If so desired, a copper sheathing may be applied to iron ships, when coated with the plastic compound, the interposition of which affords ample protection from the contact of the two metals, and consequently from voltaic action. Among other applications, the plastic matter may be used for the protection of telegraphic cables and wires, iron bridges, and similar structures, wood and stone-work, and, in general, all surfaces exposed to the action of water, air, solar rays, gaseous emanations, or other injurious influences. It may here be noted that when the nature of the intended application renders desirable the suppression of the white lead (as, for instance, when applied as a protective coating to alimentary products,) this ingredient may be replaced by an equal quantity of sulphate of barytes, in addition to that above noted.

Having now described and ascertained the nature of my said invention, and the manner of carrying it into effect, I declare that what I claim, and desire to secure by Letters Patent, is—

The preparation, substantially as herein set forth, of a plastic compound applicable to the protection of metallic and non-metallic surfaces from the action of water, air, and other causes of deterioration to which they may be exposed.

F. L. ROUX.

Witnesses:
LE SIERS
PRE. CONGOULAT.